United States Patent [19]
Weber et al.

[11] Patent Number: 5,844,420
[45] Date of Patent: Dec. 1, 1998

[54] FIXTURE FOR TESTING A HEAD GIMBAL ASSEMBLY EMPLOYING A FLEX INTERCONNECT CIRCUIT

[75] Inventors: Patrick A. Weber, Sunnyvale; Mostafa Mahmoudian, San Carlos; Victor Rudman, Palo Alto; Oleg A. Gergel, Mountain View, all of Calif.

[73] Assignee: Read-Rite Corporation, Milpitas, Calif.

[21] Appl. No.: 788,331

[22] Filed: Jan. 27, 1997

[51] Int. Cl.⁶ .......................... G01R 31/02; H01R 13/629; H01R 13/639
[52] U.S. Cl. .............................. 324/757; 324/754
[58] Field of Search ..................... 324/754, 757, 324/758, 761, 158.1

[56] References Cited

U.S. PATENT DOCUMENTS

| | | | |
|---|---|---|---|
| 5,339,702 | 8/1994 | Viches | 324/212 X |
| 5,493,237 | 2/1996 | Volz et al. | 324/754 |
| 5,550,481 | 8/1996 | Holmes et al. | 324/754 |
| 5,706,080 | 1/1998 | Pekin et al. | 324/73.1 X |

*Primary Examiner*—Glenn W. Brown
*Attorney, Agent, or Firm*—Nathan N. Kallman

[57] ABSTRACT

A test mixture for testing a head gimbal assembly has a flex interconnect circuit with one or more test pads, and includes a clamp assembly and a connector board. The clamp assembly is secured to the connector board for locking the test pads in position. The connector board includes probing pins that contact the test pads in order to establish an electrical path with the head gimbal assembly. The clamp assembly includes a base and a self-locking mechanism, with the base serving as an interface between the self-locking mechanism and the connector board. The self-locking mechanism serves to position the test pads in a desired relation relative to the probing pins and to clamp the test pads during testing. The self-locking mechanism includes a clamp arm having a guiding slide that receives part of the flex interconnect circuit for positioning the test pads within the self-locking mechanism. The connector board is secured to a magnetic test cartridge.

11 Claims, 5 Drawing Sheets

ABSTRACT

FIXTURE FOR TESTING A HEAD GIMBAL ASSEMBLY EMPLOYING A FLEX INTERCONNECT CIRCUIT

FIELD OF THE INVENTION

This invention relates to magnetic head assemblies and in particular to a test fixture and a method of using the same for testing a head gimbal assembly that employs a flex interconnect circuit.

DESCRIPTION OF THE PRIOR ART

A head gimbal assembly (HGA) is typically comprised of a head or slider, a suspension, and wire leads that extend between the slider and a paddle board. The paddle board is approximately 0.5 inch long and 0.1 inch wide. It is made of an insulation material with conductive stripes that extend across its surface. The leads are soldered to the stripes.

In order to test the HGA, a test fixture is used as an interface between the HGA and a tester. The test fixture includes a magnetic test cartridge, a printed circuit (PC) board, and a clamping mechanism. In order to test the HGA, the suspension is secured to the magnetic test cartridge, the PC board is mounted on top of the magnetic test cartridge, and the clamp is mounted on the PC board. The paddle board is then clamped by means of the clamp against probes that extend from the PC board. The test fixture is then placed in the tester for establishing electrical contact therewith and for completing the electrical path from the slider to the tester.

The present trend in the industry is to replace the conventional wire leads with a flex interconnect circuit. However, the flex interconnect circuit is not as readily testable as wire leads having a paddle board attached to it. It is highly desirable to enable the testing of HGAs with flex interconnect circuits in a reliable and relatively simple manner.

SUMMARY OF THE INVENTION

An object of this invention is to provide a novel test fixture and a method for testing a HGA employing a flex interconnect circuit. The test fixture is adapted to fit in existing testers, and is relatively simple to use. This method of using the test fixture is reliable, repeatable and minimizes if not completely eliminates damage to the flex interconnect circuit.

According to this invention, a test fixture for testing HGAs comprises a flex interconnect circuit with one or more test pads, a clamp assembly and a connector board. The clamp assembly is secured to the connector board for locking the test pads in position. The connector board includes probing pins that contact the test pads in order to establish an electrical path-with the head gimbal assembly.

The clamp assembly includes a base and a self-locking mechanism, with the base serving as an interface between the self-locking mechanism and the connector board. The self-locking mechanism serves to position the test pads in a desired relation relative to the probing pins and to clamp the test pads during testing. The self-locking mechanism includes a clamp arm having a guiding slide that receives part of the flex interconnect circuit for positioning the test pads within the self-locking mechanism. The connector board is secured to a magnetic test cartridge.

In a preferred embodiment, the clamp arm includes a stop that ensures proper and automatic alignment of the test pads relative to the probing pins. In other embodiments, the guiding slides may be adapted for use with down facing or up facing flex interconnect circuits.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily to scale and are shown for visual clarity and for the purpose of explanation.

DETAILED DESCRIPTION OF THE INVENTION

Figure 1:
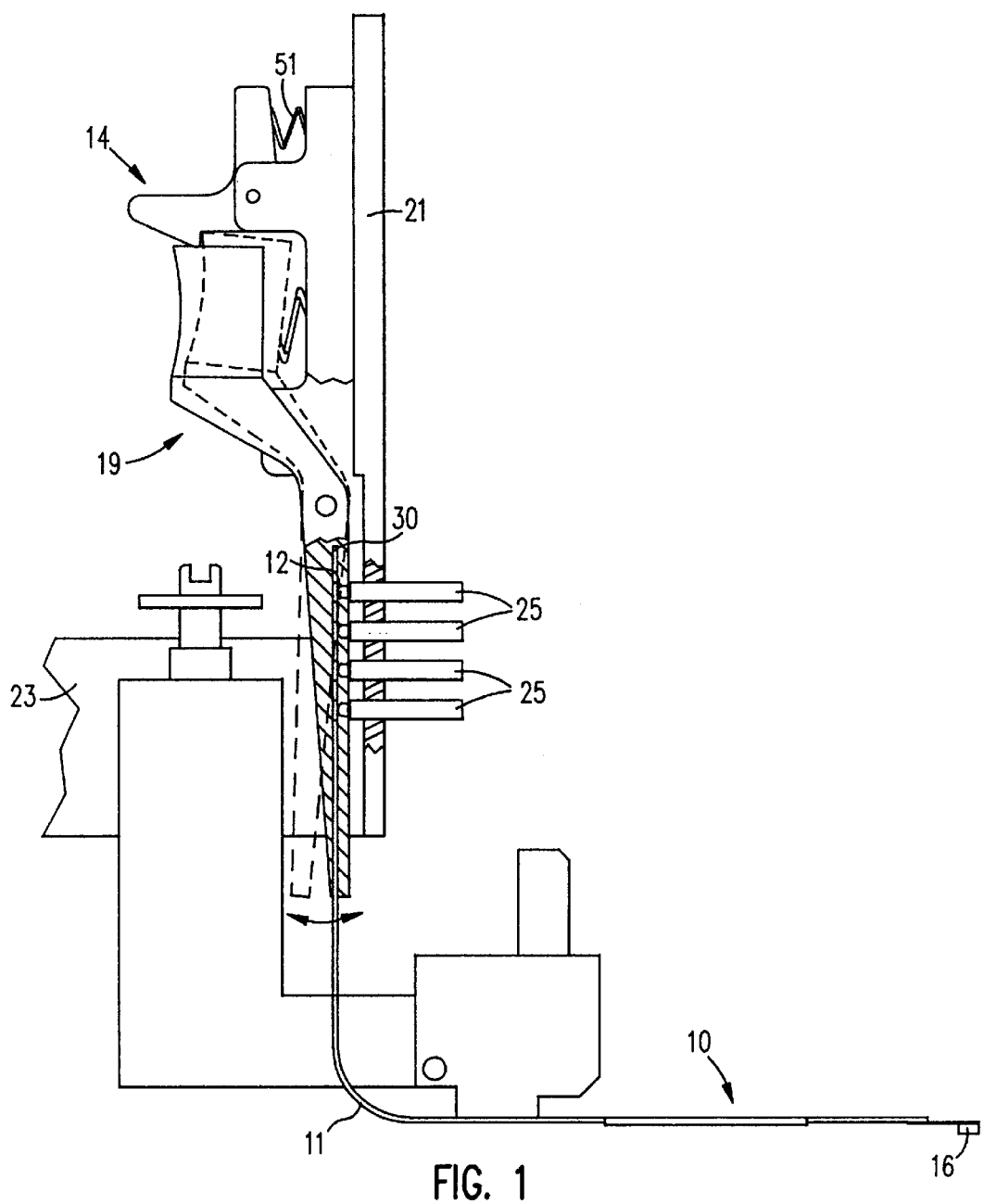
FIG. 1 is a partly broken away side view of an HGA employing a flex interconnect circuit shown mounted in a test fixture according to the present invention.
Figure 2:
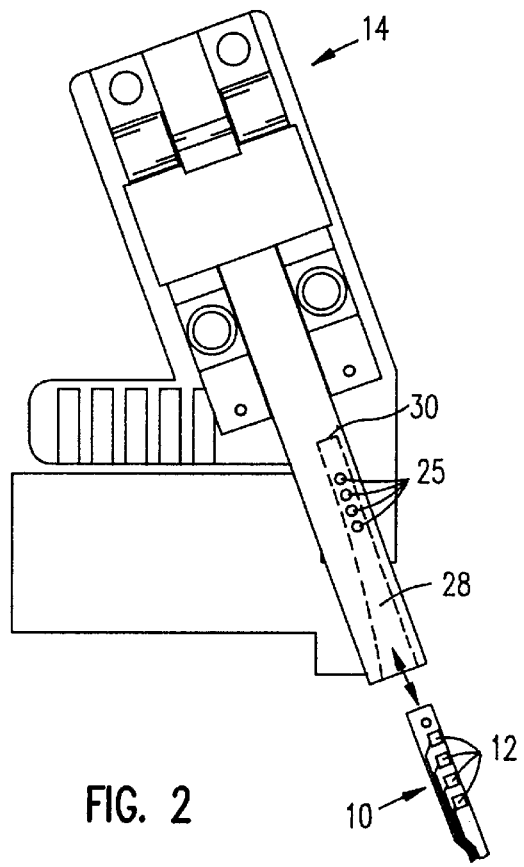
FIG. 2 is a front view of the test fixture of FIG. 1 showing a down-facing flex interconnect circuit ready to be mounted in the test fixture of FIG. 1.

With reference to FIGS. 1 and 2, an HGA 10 having a flex interconnect circuit 11 and test pads 12 is shown mounted in a test fixture 14 (FIG. 1), or ready to be mounted in the test fixture 14 (FIG. 2). The test fixture 14 locks the HGA 10 in position during testing, and further provides an electrical path between the head 16 and a tester (not shown).

The test fixture 14 is formed of a clamp assembly 19 that is secured to a connector board 21, which in turn is secured to a magnetic test cartridge 23. The clamp assembly 19 mechanically locks the test pads 12 into position on the connector board 21. A plurality of probing pins 25 form part of the connector board 21 and contact the test pads 12, for establishing an electrical path between the head 16 and the magnetic test cartridge 23. During testing, the connector board 21 positions the clamp assembly 19 in such a manner that the flex interconnect circuit 11 is maintained in its most natural position so as to avoid damaging the flex interconnect circuit 11. The magnetic test cartridge 23 may be a conventional test cartridge commonly used to test a conventional HGA having wire leads.

In use, the clamp assembly 19 is placed in an open and locked position shown in a dashed line in FIG. 1 in order to receive the test pads 12 of the flex interconnect circuit 11. An operator holds the test fixture 14 in one hand, and slides the flex interconnect circuit 11 into position along a guiding slide 28 (FIG. 2) formed in the clamp assembly 19, until it reaches a stop 30, for providing an indication that the test pads 12 are properly positioned in relation to the probing pins 25. The clamp assembly 19 is then unlocked, as shown in a solid line in FIG. 1, for causing the guiding slide 28 and the flex interconnect circuit 11 to pivot toward the connector board 21 so that the test pads 12 come in contact with the probing pins 25. The test fixture 14 is then placed in a tester for testing the HGA 10.

Figure 9:
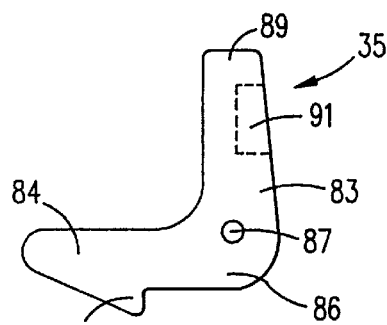
FIG. 9 is an enlarged side view of the latch of FIG. 8.
Figure 10:
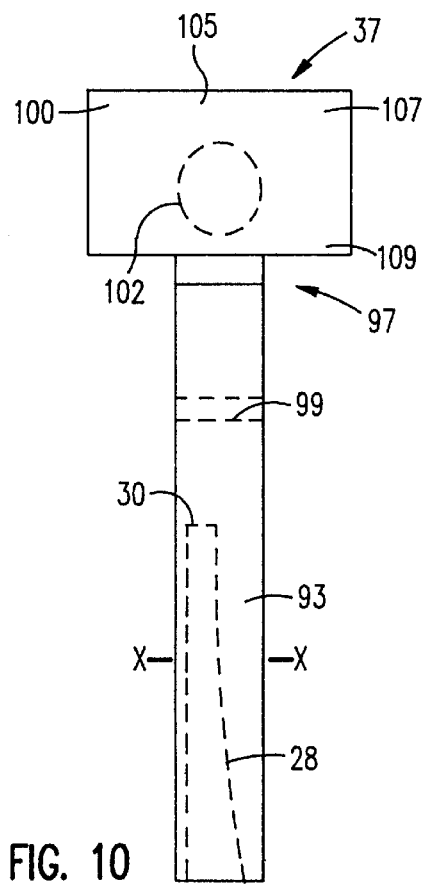
FIG. 10 is an enlarged front view of a clamp arm forming part of the clamp assembly of FIGS. 4 and 5.
Figure 11:
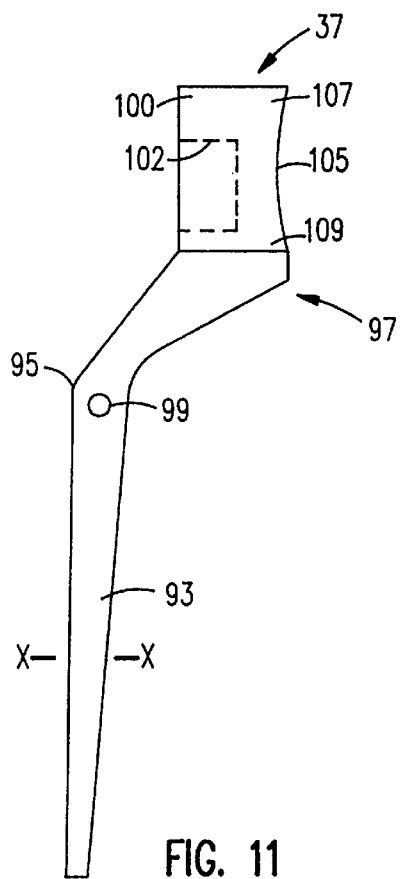
FIG. 11 is an enlarged side view of the clamp arm of FIG. 10.

With respect to FIGS. 4 through 11, the clamp assembly 19 includes a base 33 (FIGS. 6, 7) and a self-locking mechanism formed of a latch 35 (FIGS. 8, 9) and a clamp arm 37 (FIGS. 10, 11). The base 33 serves as a block for mounting the latch 35 and the clamp arm 37 onto the connector board 21.

Figure 6:
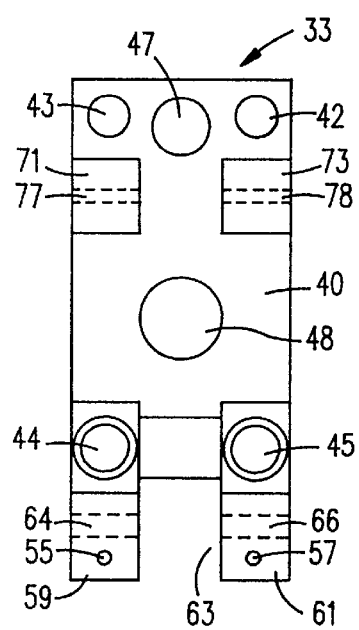
FIG. 6 is an enlarged top view of a base forming part of the clamp assembly of FIGS. 4 and 5.
Figure 7:
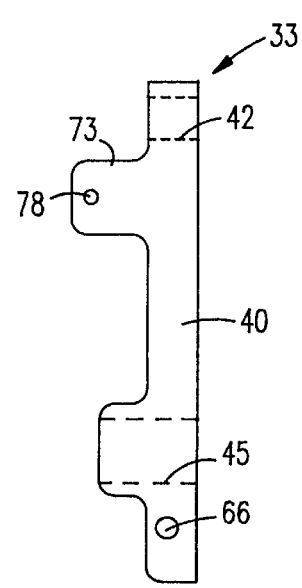
FIG. 7 is an enlarged side view of the base of FIG. 6.

With reference to FIGS. 6 and 7, the base 33 includes a machined support plate 40 on which four mounting holes 42, 43, 44, 45 are formed. The mounting holes 42 through 45 are used to secure the base 33 to the connector board 21.

Also formed on the support plate 40 is a spring bore 47 and a spring bore 48. The spring bore 47 receives part of a spring 51 (shown in FIGS. 1 and 5) that forces the latch 35 against the clamp arm 37 for retaining it in an open and locked position. This locked position keeps the clamp assembly 19 open while the flex interconnect circuit 11 is progressively inserted along the guiding slide 28 of the clamp arm 37, in between the clamp arm 37 and the connector board 21. A spring bore 48 receives part of a spring 53 (shown in FIGS. 1 and 5) that applies sufficient force to the clamp arm 37, in order to lock the flex interconnect circuit test pads 12 in position against the probing pins 25 (shown in FIG. 1) of the connector board 21.

The support plate 40 includes two legs 59, 61 that are separated by a clearance 63. Two pivot holes 64, 66 are respectively formed across the width of the two legs 59, 61, and cooperate with a pin 68 (FIG. 5) that extends therethrough to form a first pivot point. The pin 68 also extends through the clamp arm 37 for enabling it to pivot between an open, locked position and a closed, unlocked position.

The support plate 40 further includes two oppositely disposed raised edges 71, 73 that are separated by a clearance. Two pivot holes 77, 78 are respectively formed across the width of the two raised edges 71, 73 and cooperate with a pin 80 (FIG. 5) that extends therethrough to form a second pivot point. The pin 80 also extends through the latch 35 for enabling it to pivot between a relaxed state with the clamp arm 37 in the closed, unlocked position, and an engagement state with the clamp arm 37 in the open, locked position.

The support plate 40 may optionally include two placement holes 55, 57 to ensure proper alignment and positioning of the support plate 40 relative to the connector board 21.

Figure 8:
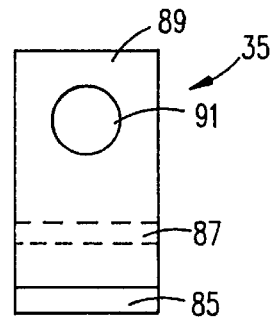
FIG. 8 is an enlarged front view of a latch forming part of the clamp assembly of FIGS. 4 and 5.

With reference to FIGS. 8 and 9, the latch 35 includes an L-shaped member 83 that terminates at one of its ends 84 in an edge 85 designed to engage the clamp arm 37 in the open, locked position. The member 83 also includes an elbow 86 that fits within the clearance between the two raised edges 71 and 73 of the base. A pivot hole 87 is formed across the width of the elbow 86 such that when the latch 35 is seated between the two raised edges 71 and 73 of the base, the pivot hole 87 coincides with the pivot holes 77 and 78 for allowing the pin 80 to pass through the three pivot holes 77, 78 and 87 in order to form the second pivot point.

Figure 5:
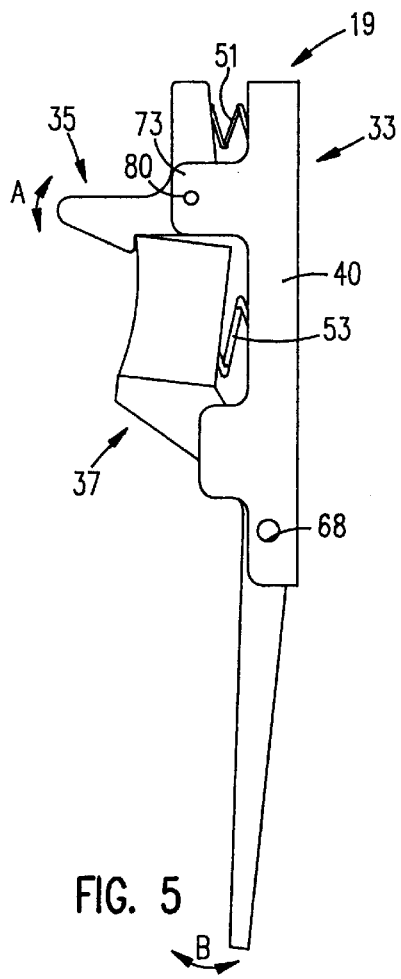
FIG. 5 is an enlarged side view of the clamp assembly of FIG. 4.
Figure 4:
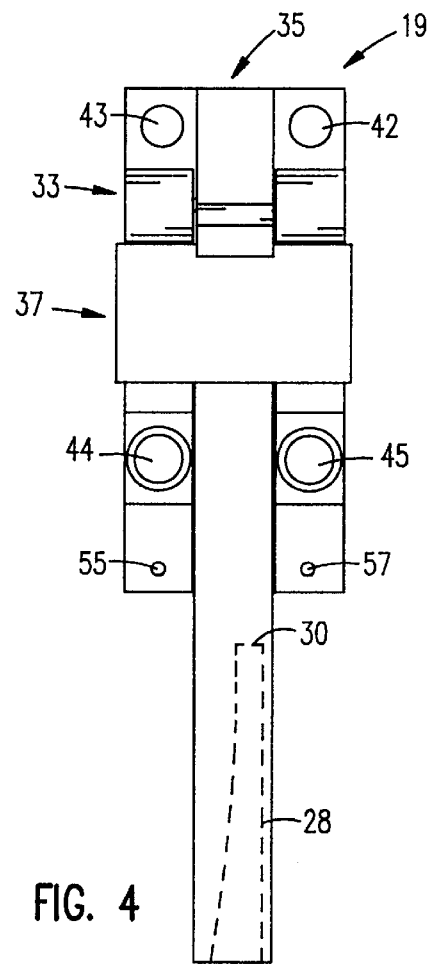
FIG. 4 is an enlarged front view of a clamp assembly forming part of the test fixture of FIGS. 1, 2 and 3.

The other end 89 of the member 83 includes a spring bore 91 that substantially coincides with the spring bore 47 (FIG. 6) for accommodating part of the spring 51 (FIG. 5). The spring-generated force allows the latch 35 to pivot around the second pivot point in the directions of the arrow A (FIG. 5).

The clamp arm 37 has two main functions. The first function is to position the flex interconnect circuit test pads 12 in a desired relation relative to the probing pins 25 of the connector board 21 (FIG. 1). The second function is to clamp the flex interconnect circuit test pads 12 against the probing pins 25 during testing.

The positioning of the flex interconnect circuit test pads 12 is realized by means of the guiding slide 28 and the stop 30. The guiding slide 28 receives the flex interconnect circuit test pads 12 and is covered in part, for instance up to reference line X—X, by the connector board 21 (FIGS. 10 and 11). The stop 30 ensures a proper and automatic alignment of the flex interconnect circuit test pads 12 relative to the probing pins 25. The guiding slide 28 is formed in an elongated guide member 93, and is shaped to receive the flex interconnect circuit 11 of the HGA 10 to be tested.

The guide member 93 extends integrally in an elbow 95 and further in a lever 97. The elbow 95 is seated pivotally in the clearance 63 (FIG. 6) between the two legs 59 and 61 of the support plate 40. For this purpose, a pivot hole 99 is formed across the width of the elbow 95 such that when the clamp arm 37 is seated between the two legs 59 and 61, the pivot hole 99 coincides with the pivot holes 64 and 66 in the legs 59 and 61, respectively, for allowing the pin 68 (FIG. 5) to pass through the three pivot holes 64, 66 and 99 in order to form the first pivot point.

The clamping function of the clamp arm 37 is achieved by means of a pad 100 that forms part of the lever 97. The pad 100 includes a spring bore 102 (shown in dashed lines) that substantially coincides with the spring bore 48 (FIG. 6) for accommodating part of the spring 53 (FIG. 5). The spring-generated force allows the clamp arm 37 to pivot around the pivot point in the direction of the arrow B (FIG. 5).

The upper surface 105 of the pad 100 is curved and has two raised edges 107, 109 for achieving two purposes. The first purpose is to allow the latch 35 to mate with the clamp arm 37, by having the edge 85 of the latch 35 enter into a locking or an unlocking engagement with the raised edge 107 of the pad 100. The second purpose of the pad 100 is to accommodate the tip of the operator's digit for compressing the spring 53.

Figure 3:
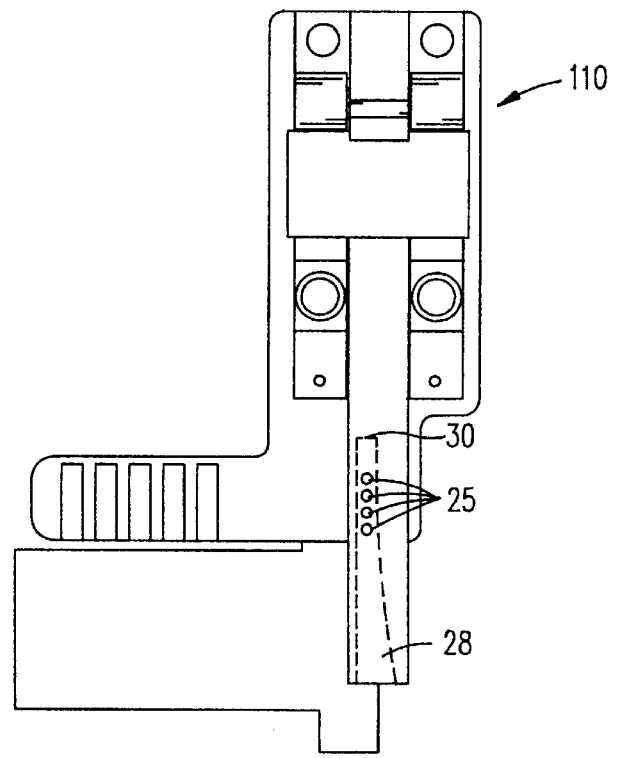
FIG. 3 is a front view of another test fixture, made according to the present invention adapted for use with a down-facing flex interconnect circuit having a different design than the flex interconnect circuit illustrated in FIG. 2A.
Figure 2A:
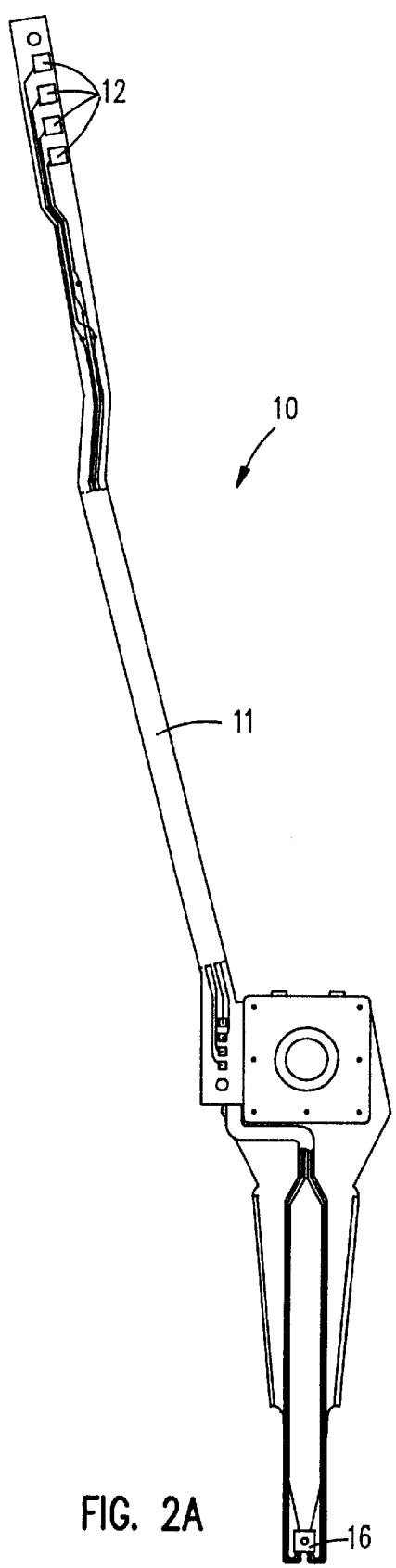
FIG. 2A is an enlarged front view of the HGA of FIG. 1.
Figure 12:
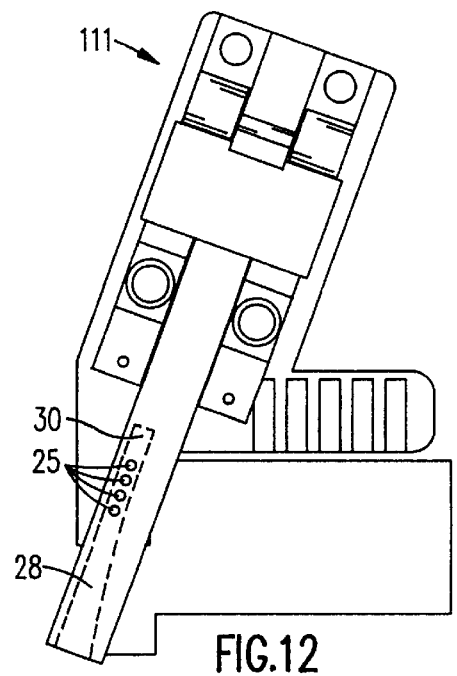
FIG. 12 is a front view of another test fixture, made according to the present invention adapted for use with an up-facing flex interconnect circuit.
Figure 13:
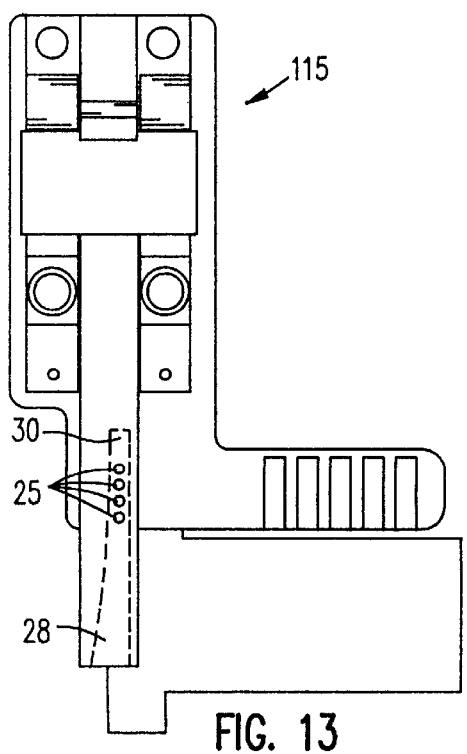
FIG. 13 is a front view of yet another test fixture, made according to the present invention, adapted for use with an up-facing flex interconnect circuit of a different design.

FIGS. 3, 12 and 13 illustrate alternative embodiments of the test fixture according to the present invention, having similar components to those of the test fixture 14 of FIG. 2. FIG. 3 shows a test fixture 110 adapted for use with a down-facing flex interconnect circuit having a different design than the flex interconnect circuit 11 illustrated in FIG. 2A. FIG. 12 shows a test fixture 111 adapted for use with an up-facing flex interconnect circuit. FIG. 13 shows another test fixture 115 adapted for use with an up-facing flex interconnect circuit of a different design.

Figure 14:
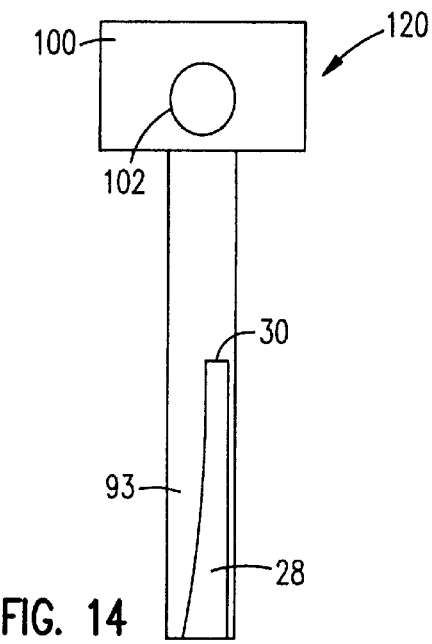
FIG. 14 is an enlarged front view of a clamp arm forming part of the test fixtures of FIGS. 12 and 13 used in conjunction with an up-facing HGA.
Figure 15:
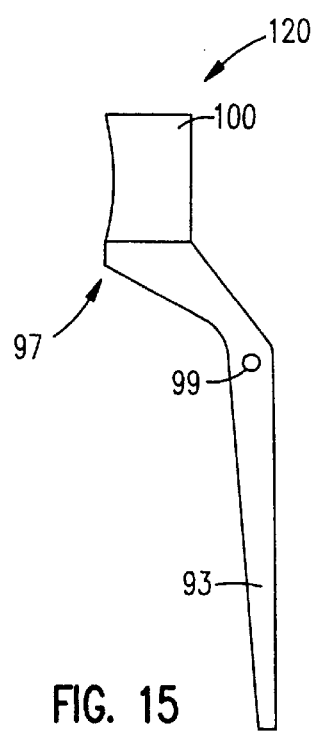
FIG. 15 is an enlarged side view of the clamp arm of FIG. 14.

FIGS. 14 and 15 illustrate another clamp arm 120 forming part of either of the clamp assemblies 110, 115 adapted for use with an up-facing HGA. The clamp arm 120 is similar to the clamp arm 37 of FIGS. 10 and 11, but has a mirror image configuration The test fixture is adapted to fit in existing testers, and is relatively simple to use. The method of using the test fixture is reliable, repeatable and minimizes if not completely eliminates damage to the flex interconnect circuit.

It should be understood that the geometry, dimensions, parameters and composition of the test fixtures described above may be modified within the scope of the invention. For instance, while only four probing pins 25 are shown, it should be clear that a different number of probing pins may alternatively be used.

What is claimed is:

1. A test fixture for testing a head gimbal assembly having a flex interconnect circuit with one or more test pads, comprising:

a connector board including a plurality of probing pins that contact the test pads in order to establish an electrical path with the head gimbal assembly;

a clamp assembly secured to said connector board for locking the test pads in position on said connector board;

said clamp assembly including a base and a self-locking mechanism, with said base serving as an interface between said self-locking mechanism and said connector board;

said self-locking mechanism serving to position the test pads in a desired relation relative to said plurality of probing pins, and for clamping the test pads against said plurality of probing pins during testing; and said self-locking mechanism including a clamp arm having a guiding slide that receives part of the flex interconnect circuit for positioning the test pads within said self-locking mechanism.

2. The test fixture according to claim 1, wherein said clamp arm includes a stop that ensures proper and automatic alignment of the test pads relative to said plurality of probing pins.

3. The test fixture according to claim 2, wherein said self-locking mechanism includes a latch.

4. The test fixture according to claim 3, including a magnetic test cartridge to which said connector board is secured.

5. The test fixture according to claim 3, wherein said guiding slide is formed in an elongated guide member and is shaped to receive the flex interconnect circuit of the head gimbal assembly to be tested.

6. The test fixture according to claim 3, wherein said guiding slide extends in the form of an elbow and a lever.

7. The test fixture according to claim 6, wherein said base includes a support plate; and wherein said guiding slot is pivotally secured to said support plate.

8. The test fixture according to claim 7, wherein said lever includes a spring-loaded pad that allows said latch to mate with said clamp arm.

9. The test fixture according to claim 8, wherein said latch terminates in an edge for engaging said clamp arm in an open, locked position.

10. The test fixture according to claim 9, wherein said guiding slide is made to co-act with an up-facing flex interconnect circuit.

11. The test fixture according to claim 9, wherein said guiding slide is made to co-act with a down-facing flex interconnect circuit.

\* \* \* \* \*